(12) United States Patent
Hand

(10) Patent No.: US 6,422,520 B1
(45) Date of Patent: Jul. 23, 2002

(54) UNIVERSAL MOUNTING BRACKET

(76) Inventor: James F. Hand, 3210 E. 13th St., Des Moines, IA (US) 50316

( * ) Notice: Subject to any disclaimer, the term of this patent is extended or adjusted under 35 U.S.C. 154(b) by 0 days.

(21) Appl. No.: 09/603,709

(22) Filed: Jun. 27, 2000

(51) Int. Cl.[7] .................................................. F16L 3/08
(52) U.S. Cl. ........................ 248/65; 137/359; 137/360; 248/49; 248/74.1
(58) Field of Search ............................. 248/48.1, 48.2, 248/49, 65, 79, 75, 212, 342, 344, 74.1, 56, 67, 67.5; 137/359, 360, 801; 4/191, 567, 597

(56) References Cited

U.S. PATENT DOCUMENTS

| | | | | |
|---|---|---|---|---|
| 1,436,027 A | * | 11/1922 | Ferris | 137/359 |
| 4,426,126 A | * | 1/1984 | De Vos et al. | 339/125 R |
| 4,723,881 A | * | 2/1988 | Duran | 411/353 |
| 4,896,381 A | | 1/1990 | Hutto | 4/191 |
| 5,031,658 A | | 7/1991 | Brattoli | 137/377 |
| 5,195,553 A | | 3/1993 | Wright | 137/359 |
| 5,277,220 A | * | 1/1994 | Thul | 137/359 |
| 5,353,448 A | * | 10/1994 | Lee | 4/597 |
| 5,704,080 A | * | 1/1998 | Kuhne | 4/605 |
| 5,813,431 A | | 9/1998 | Cool et al. | 137/360 |
| 5,845,673 A | | 12/1998 | Paul | 137/360 |
| 6,149,107 A | * | 11/2000 | Kerr et al. | 248/49 |
| 6,178,981 B1 | * | 1/2001 | Wales | 137/15.8 |

* cited by examiner

Primary Examiner—Ramon O. Ramirez
Assistant Examiner—Tan Le

(57) ABSTRACT

A universal mounting bracket (20) being configured to mount a prepared shower mixing valve (55) directly to the reverse side of a fiber glass shower wall (52). A direct mounting is realized when a nearly circular mounting aperture (24) within the mounting bracket body (22) is aligned with a prepared mating aperture (54) through the fiber glass wall. The mounting bracket (20) is attached with a plurality of U shaped spring clips (46) that snap into a plurality of rectangular apertures (30) located on the bracket body (22). The mounting bracket comprises a plurality of rearward protruding forked projections (32) axial positioned at 90 degrees to one another on the outer rim of the bracket body. The configuration of the forked projections (32) allow a plurality of copper tubes (58) of the prepared mixing valve (55) to be saddled and secured into the forked projections (32). A valve control stem (60) of the secured mixing valve (55) projects through the apertures to receive a escutcheon (62), mounting screws (64), and a control handle, all located on the interior side of the fiber glass shower wall.

5 Claims, 7 Drawing Sheets

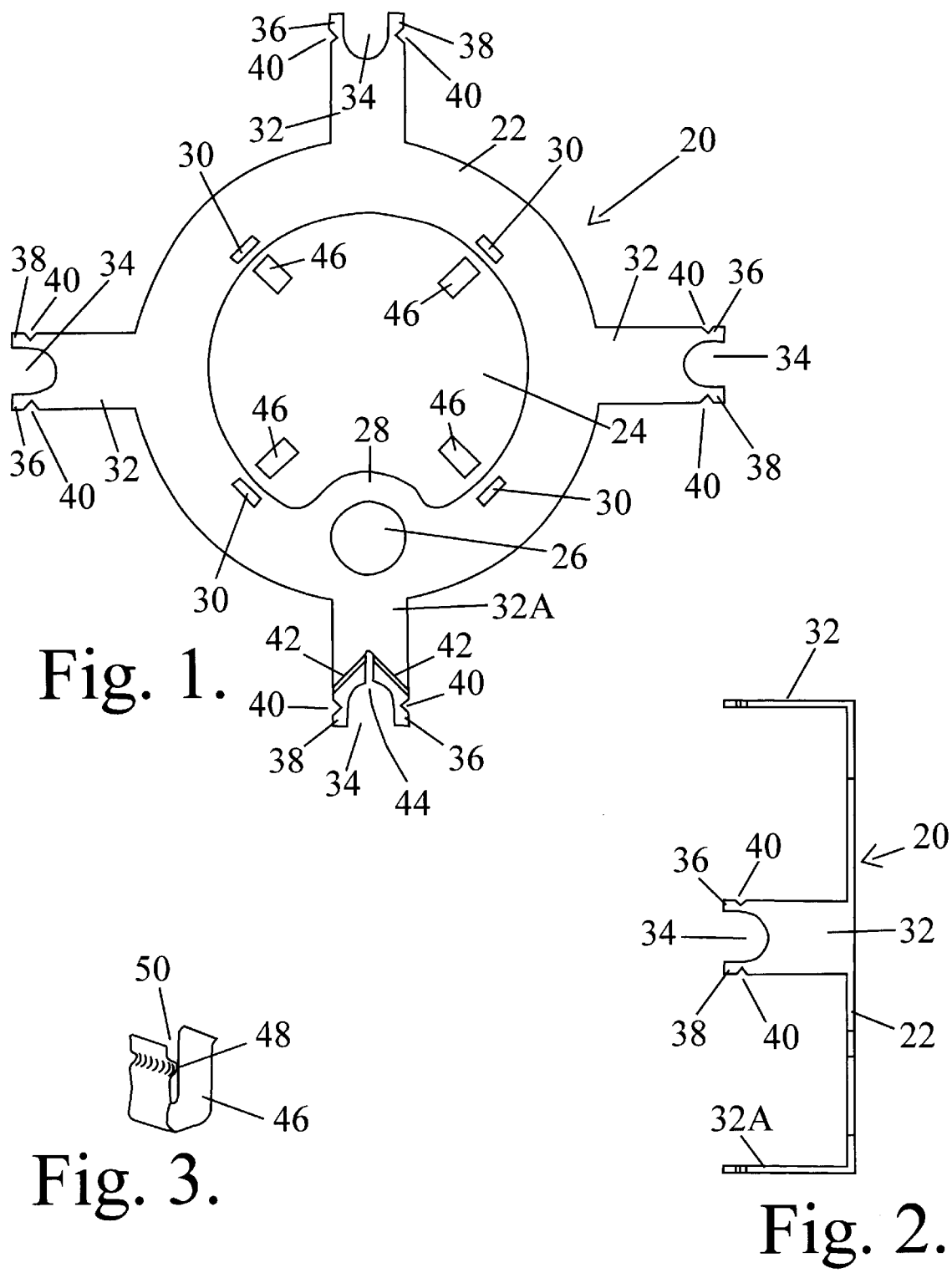

UNIVERSAL MOUNTING BRACKET

CROSS-REFERENCE TO RELATED APPLICATIONS

Not applicable

1. Background-Field of Invention

My invention relates to metal mounting brackets, specifically to such brackets which are used for mounting tub and shower mixing valves or shower only mixing valves to fiber glass shower walls.

2. Background-Description of Prior Art

Shower mixing valves, specifically those which are operated by the manipulation of a single control lever have long been affixed to a wood framed base wall being located behind a fiber glass enclosure or a combination fiber glass tub and shower unit. Such framed base walls usually being constructed of 2"×4" dimensional lumber and consisting of a top and bottom plate and several vertical stud members.

A standard practice for the mounting of a shower mixing valve is accomplished by attaching the mixing valve directly to a horizontal wood member positioned between two of the vertical studs. This procedure requires the installer to first cut, fit, and atttach the horizontal wood member at a precise set-back distance from the fiber glass wall, and in alignment with a prepared aperture within the wall. The described procedure is difficult and time consuming since the mixing valve must first be attached to the horizontal member in advance of attaching the horizontal member to the vertical studs. Reasonable alignment and set-back of the valve in relation to the wall and wall aperture becomes a challenge even for a skilled individual.

Another problem encountered with the above described procedure is once the mixing valve has been attached to the horizontal wood member, the mixing valve is now located between the fiber glass wall and the horizontal wood member. At this stage of the installation, the mixing valve is virtually hidden from view, and mostly inaccessible to the installer, who must now solder related copper tubing to complete the installation. Upon inspecting valves installed in this manner, it's quite common to witness wood that has come into contact with the installers torch flame. Controlling such hazards requires cautious planning and considerable expertise on behalf of an installer. Therefore, such installations are usually directed to the most skilled installers or employees.

U.S. Pat. No. 5,813,431 to Cool and Schmeddling, 1998 discloses a mounting plate that can be attached directly to a shower mixing valve that has been manufactured with a specific flange for accepting the mounting plate. Since most manufactures of shower mixing valves would be reluctant to change their manufactured valve to accommodate this style of mounting, the mounting plate would be of limited use. The patent to Cool and Schmeddling also discloses as a preferred method, the shower mixing valve being roughed in prior to the installation of the shower wall. Such installation would render the described mounting plate inept, or of little use if the mixing valve was to be either suspended from the attached shower head piping or to stand alone off the floor upon the hot and cold water inlet piping. Also no mention is made of the mounting plate being directly attached to any framing member or the later installed shower wall. A secure mounting is only realized when the escutcheon is placed over the valves control stem, abutting the interior of the shower wall, and attached to the mixing valve with screws, sandwiching the shower wall between the escutcheon and mounting plate.

U.S. Pat. No. 4,896,381 to Hutto, 1990 discloses a combination plaster guard and mounting bracket that can be used to install a shower mixing valve onto a fiber glass wall. The disclosure describes a mixing valve being, more or less hand placed into a notch provided on the mounting bracket. The mounting bracket and valve are then aligned with a prepared aperture through a fiber glass shower wall. The mixing valve being mounted when an escutcheon is placed over the valves control stem abutting the interior side of the shower wall. Screws are passed through mounting holes in the escutcheon and secured to the mixing valve, sandwiching the mounting bracket and the shower wall between the escutcheon and the mixing valve. The disclosure makes no mention of the mounting bracket being directly attachable to a fiber glass wall, or any mention of the mixing valve being directly fastened to the mounting bracket. A problem is realized from the above described mounting process which is, the mounting bracket and valve require the assistance of a helper to install the escutcheon and screws while the installer holds the mounting bracket and valve onto the reverse side of the shower wall. Another problem is realized with the mounting bracket since it is constructed of plastic, which will burn if the installers torch flame comes into contact with the bracket when soldering related copper tubing members to the valve. Also, the mounting bracket can and will melt or distort from over heated copper tubing in close proximity to the bracket. A final limiting factor is that the mounting bracket is only available for one specific brand of shower mixing valve.

SUMMARY

My universal mounting bracket is a metal bracket for mounting a variety of tub and shower mixing valves onto fiber glass walls of bathing structures.

OBJECTS AND ADVANTAGES

My universal mounting bracket as described in the summary has many objects and advantages to help an installer overcome the problems related to the installation of tub and shower mixing valves onto fiber glass walls, the objects and advantages being;

1. The mounting bracket eliminates the long standing practice of having to attach the mixing valve to wood framing members.
2. The mounting bracket eliminates the danger of fire associated with soldering copper tubing to a mixing valve when attached to wood framing members.
3. The mounting bracket substantially enhances a perfected installation within a substantially reduced period of time.
4. The entire operation of installing a shower mixing valve onto a fiber glass wall can be performed by a single individual, when the mounting bracket is used, eliminating the need for having a helper.
5. The mounting bracket is provided with spring clips for semi-securely attaching the bracket directly to the rear of a fiber glass wall, leaving both hands of the installer free to perform other related work.
6. The mounting bracket is also provided with a method for securing a prepared shower mixing valve or tub and shower mixing valve directly to the mounting bracket with the mounting bracket being attached to the shower wall.
7. Because, the mounting bracket is manufactured of metal, it will not burn or melt at the temperatures used during the soldering of related copper tubing and fittings.

8. Because, the mounting bracket is only semi-securely attached to the fiber glass wall, minor rotational adjustments can be made to perfect the installation before securely attaching the front mounted escutcheon with attachment screws.
9. Because, the mounting bracket is simple in design and manufactured of thin sheet metal, it can be easily mass-produced, inexpensively.
10. Because, the mounting bracket is designed to attach to the copper tubing of a prepared mixing valve, it will accommodate the mounting of numerous brands of shower mixing valves.
11. Because, the mounting bracket eliminates all previous problems associated with the mounting of shower mixing valves, apprentice installers can also be assigned to perform the task, rather than only the most skilled.
12. The mounting bracket is designed and manufactured in a specific manner to provide a correct set-back distance of the valve from the fiber glass wall to create an optimum aesthetic appearance when the escutcheon and control handle are attached.

In summary, because, the mounting bracket is designed and manufactured in a specific manner, and of a specific material, numerous brands of shower mixing valves can be installed easily and safely by a single individual in less time without incident.

Additional objects and advantages are not only to provide an easier and quicker mounting alternative for the professional plumber, but also an easier and safer mounting alternative for the general public.

Still, further objects and advantages may become apparent from the included descriptions and drawings.

DRAWING FIGURES

FIG. 1 shows a front view of the mounting bracket before the process of deforming the metal. Also shown, is a front view of four spring clips.

FIG. 2 shows a side view of the mounting bracket after the process of deforming the metal is completed.

FIG. 3 shows an enlarged perspective view of an individual spring clip.

Figure 4:
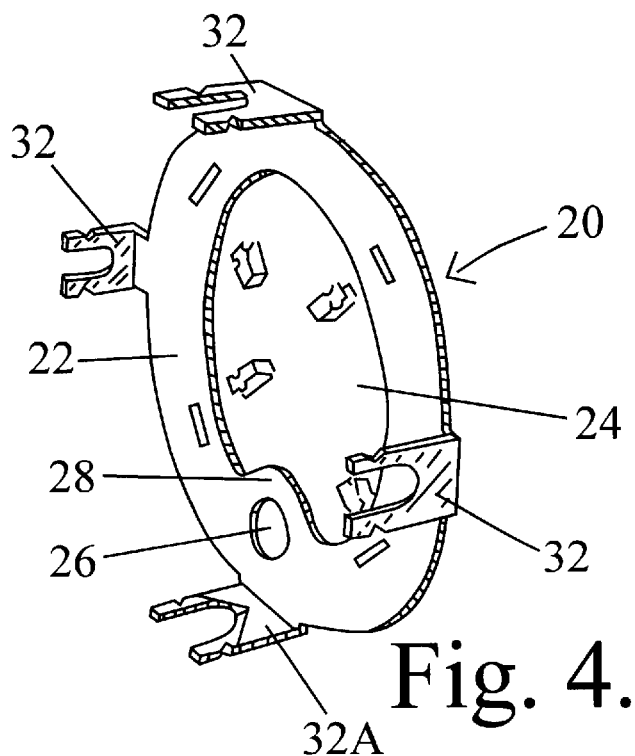
FIG. 4 shows a perspective view of alternative embodiments of the mounting bracket and spring clips.

| REFERENCE NUMERALS IN DRAWINGS | | | |
|---|---|---|---|
| 20 | universal mounting bracket | 46 | U shaped spring clips |
| 22 | bracket body | 48 | configured projection |
| 24 | nearly circular aperture | 50 | space |
| 26 | diverter aperture | 52 | fiber glass wall |
| 28 | arched web | 54 | prepared wall aperture |
| 30 | receiving aperture | 55 | prepared shower mixing valve |
| 32 | forked projection | 56 | mixing valve |
| 32A | forked projection | 58 | tubing members |
| 34 | U shaped void | 60 | mixing valve control stem |
| 36 | left prong | 62 | escutcheon |
| 38 | right prong | 64 | attachment screws |
| 40 | notch | 66 | tapped receptacles |
| 42 | cleavage indentation | 68 | lower embodiment |
| 44 | central slot | | |

DESCRIPTION OF THE PREFERRED EMBODIMENT

Referring to FIGS. 1, 2, 3, and 12, a universal mounting bracket 20 comprised of a flat bracket body 22 which is circular in shape and manufactured of sheet metal 0.8 mm to 1 mm in thickness. The bracket body 22 is 159 mm in diameter and has a nearly circular mounting aperture 24, 108 mm in diameter through its center. The bracket body 22 also having a circular diverter aperture 26, 25.5 mm in diameter, located directly below the nearly circular mounting aperture 24, and in alignment on a vertical axis with the mounting aperture. An upper portion of the diverter aperture 26 being within the radius of the mounting aperture 24, and the two apertures being materially separated by a arched web 28 formed on the bracket body 22. The bracket body 22 having a plurality of receiving apertures 30, 3.2 mm×9.5 mm, axial positioned adjacent to the nearly circular aperture.

A universal mounting bracket 20 comprised of a plurality of forked projections 32 and 32A, 25.5 mm wide and 51 mm in length, axial positioned at 90 degrees to one another, upon the outer rim of the bracket body 22. The forked projections 32 and 32A having been bent at a right angle and pointing rearward in relation to the bracket body 22, as shown in FIG. 2.

The forked projections 32 and 32A being configured with a centrally located U shaped void 34, 15.9 mm wide and 15.9 mm deep, creating a left prong 36, and a right prong 38 upon each forked projection. Each left and right prong 36 and 38 having a notch 40 located upon their leading edges. A forked projection 32A, as shown enlarged in FIG. 12, having a V shaped cleavage indentation 42 stamped into its embodiment. The cleavage indentation 42 projecting outward from a central slot 44, to each leading edge of the forked projection.

A plurality of U shaped metal spring clips 46, having a configured projection 48, as shown enlarged in FIG. 3, incorporated into the embodiment of each spring clip. The spring clips 46, having a width of 6.4 mm, and a height of 12.8 mm, and a space 50, of 7 mm.

Additional Embodiments

Not applicable

Alternative Embodiments

Figure 5:
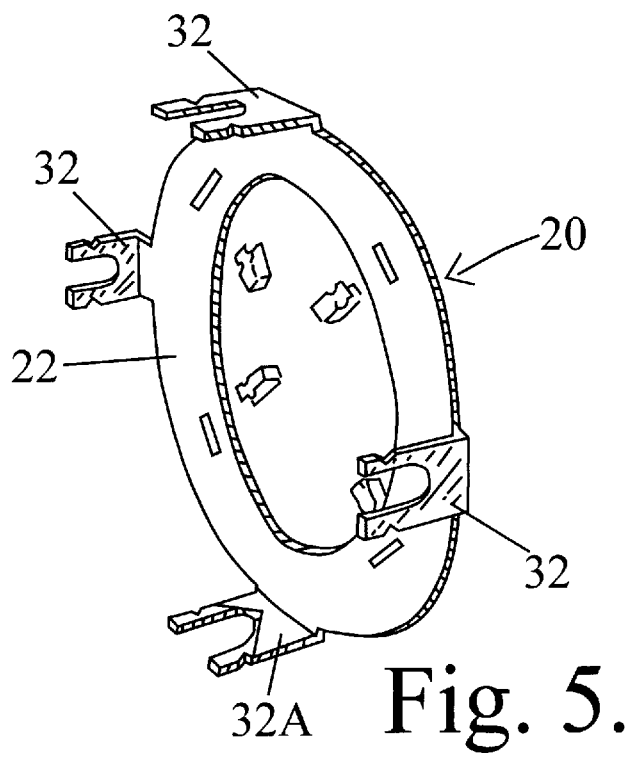
FIG. 5 shows a perspective view of alternative embodiments of the mounting bracket and spring clips.

Referring to FIGS. 4 and 5, there are a variety of possibilities concerning the manufacturing of the mounting bracket, which are;

1. A universal mounting bracket 20, could be manufactured with a mounting body 22, of greater or lesser diameter, and a plurality of forked projections 32 and 32A, being longer or shorter.

2. A universal mounting bracket 20, could be manufactured of other sheet metal alternatives, such as galvanized sheet metal, copper plated metal, or sheet copper, or their equivalents.

3. A universal mounting bracket 20 could be manufactured of sheet metal with the entire embodiment or a plurality of forked projections 32 and 32A being coated with a die-electric material, such as plastic or its equivalent.

4. A universal mounting bracket 20, being manufactured without a diverter aperture 26, or a arched web 28, which arched web separates the diverter aperture from the nearly circular mounting aperture 24, as shown in FIG. 5.

Advantages

From the above descriptions, a number of advantages concerning my universal mounting bracket become evident;

1. The entire embodiment of the universal mounting bracket can be die cut and deformed in a single operation, simplifying the manufacturing process.

2. Large quantities of mounting brackets can be produced from a roll of thin sheet metal, keeping their individual costs well within reason.

3. The mounting bracket being constructed of sheet metal makes them strong, durable, and fire resistant.

4. The mounting bracket can be manufactured of various sheet metal alternatives that will resist corrosion.

5. The mounting bracket is small and light weight, making it easy to box, and inexpensive to ship.

Operation

Figure 6:
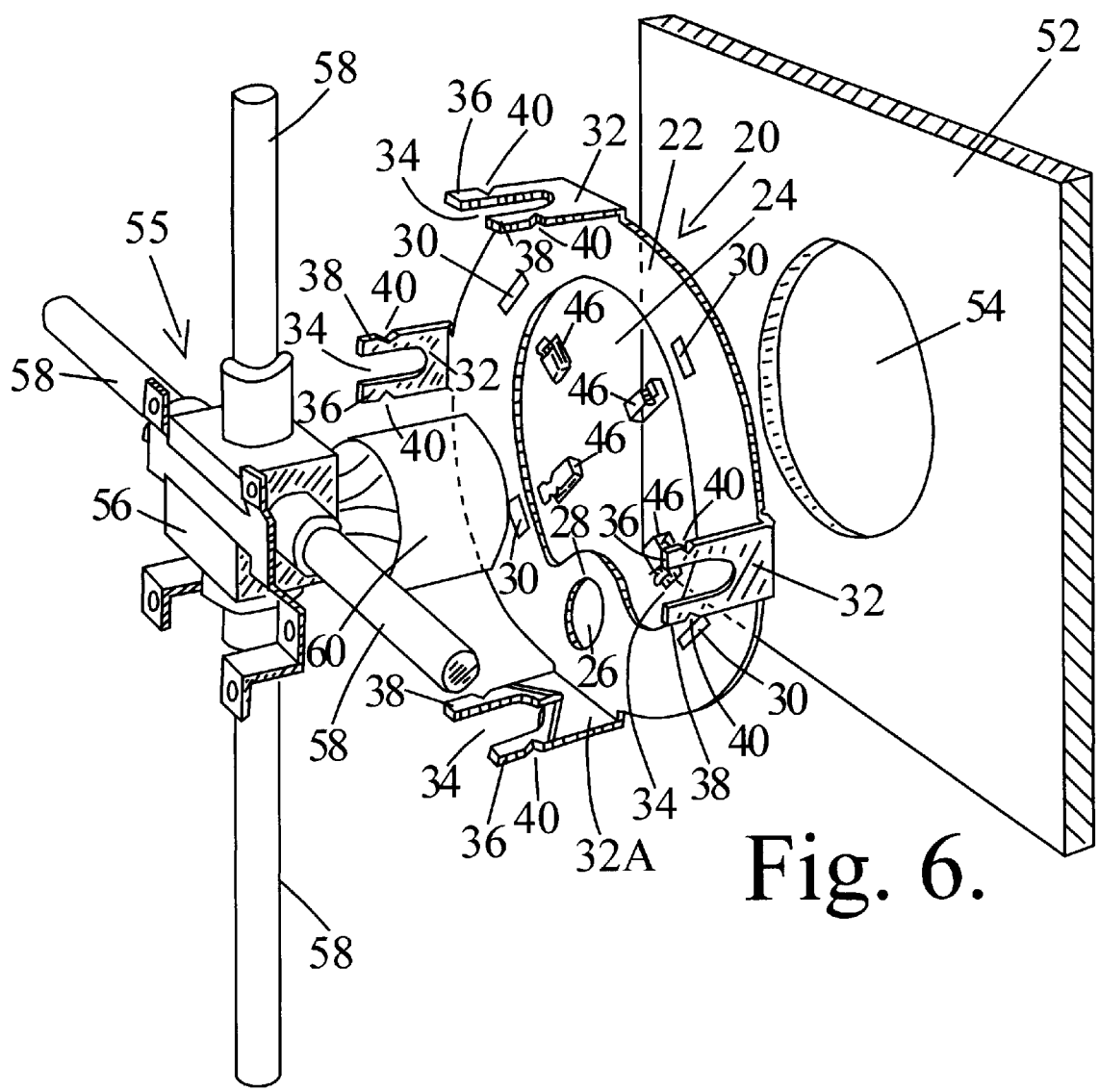
FIG. 6 shows a perspective/exploded view of the mounting bracket, spring clips, prepared shower mixing valve, and a section of a fiber glass shower wall.
Figure 7:
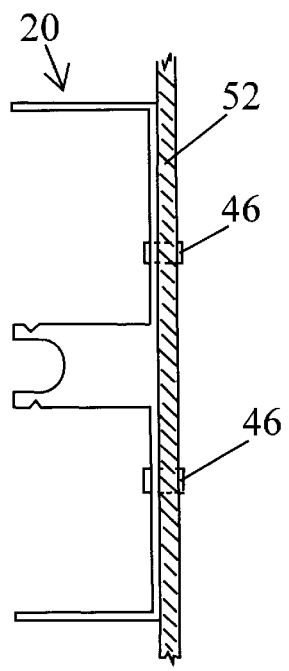
FIG. 7 shows a side view of the mounting bracket attached with spring clips to a section of a fiber glass shower wall.

Referring to FIGS. 3 and 6, a universal mounting bracket 20, comprised of a flat bracket body 22, which is circular in shape and having a nearly circular mounting aperture 24 located through its center. The mounting bracket 20 also having a circular diverter aperture 26 located directly below the mounting aperture, and in alignment on a vertical axis with the mounting aperture. An upper portion of the diverter aperture 26 being within the radius of the mounting aperture 24, and the two apertures being materially separated by a arched web 28 formed on the bracket body 22. The mounting bracket 20 having a plurality of receiving apertures 30, axial positioned adjacent to the nearly circular aperture. The universal mounting bracket 20 comprising a plurality of U shaped metal spring clips 46, having a configured projection 48, as shown enlarged in FIG. 3, incorporated into the embodiment of each spring clip.

Figure 8:
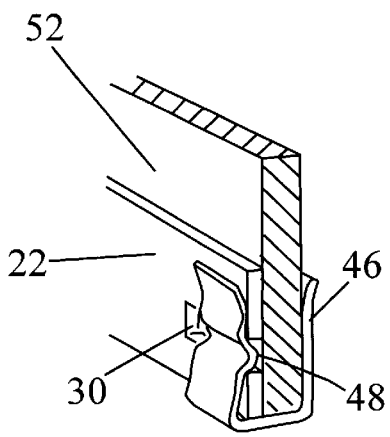
FIG. 8 shows an enlarged perspective/cross sectional view of a spring clip retaining the mounting bracket to a section of a fiber glass shower wall.
Figure 12:
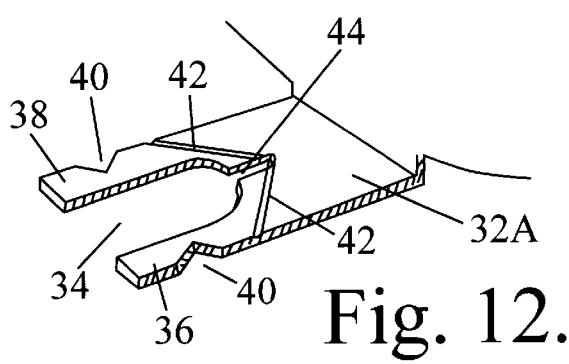
FIG. 12 shows an enlarged perspective view of the lower forked projection of the mounting bracket.
Figure 13:
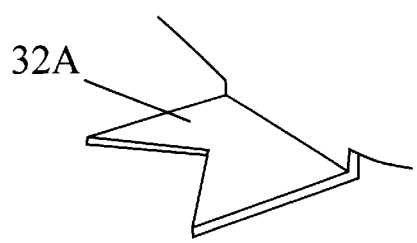
FIG. 13 shows an enlarged perspective view of an altered lower forked projection of the mounting bracket.

Referring now to FIGS. 6,. 7, and 8, the universal mounting bracket 20 to be abutted to the rear of a fiber glass wall 52, in alignment with a prepared wall aperture 54. A plurality of spring clips 46 are pushed over the abutted bracket body 22, and the fiber glass wall 52, snapping the configured projections 48 of the spring clips 46 into the receiving apertures 30, as shown enlarged in FIG. 8, semi-securely affixing the mounting bracket to the fiber glass wall.

Figure 9:
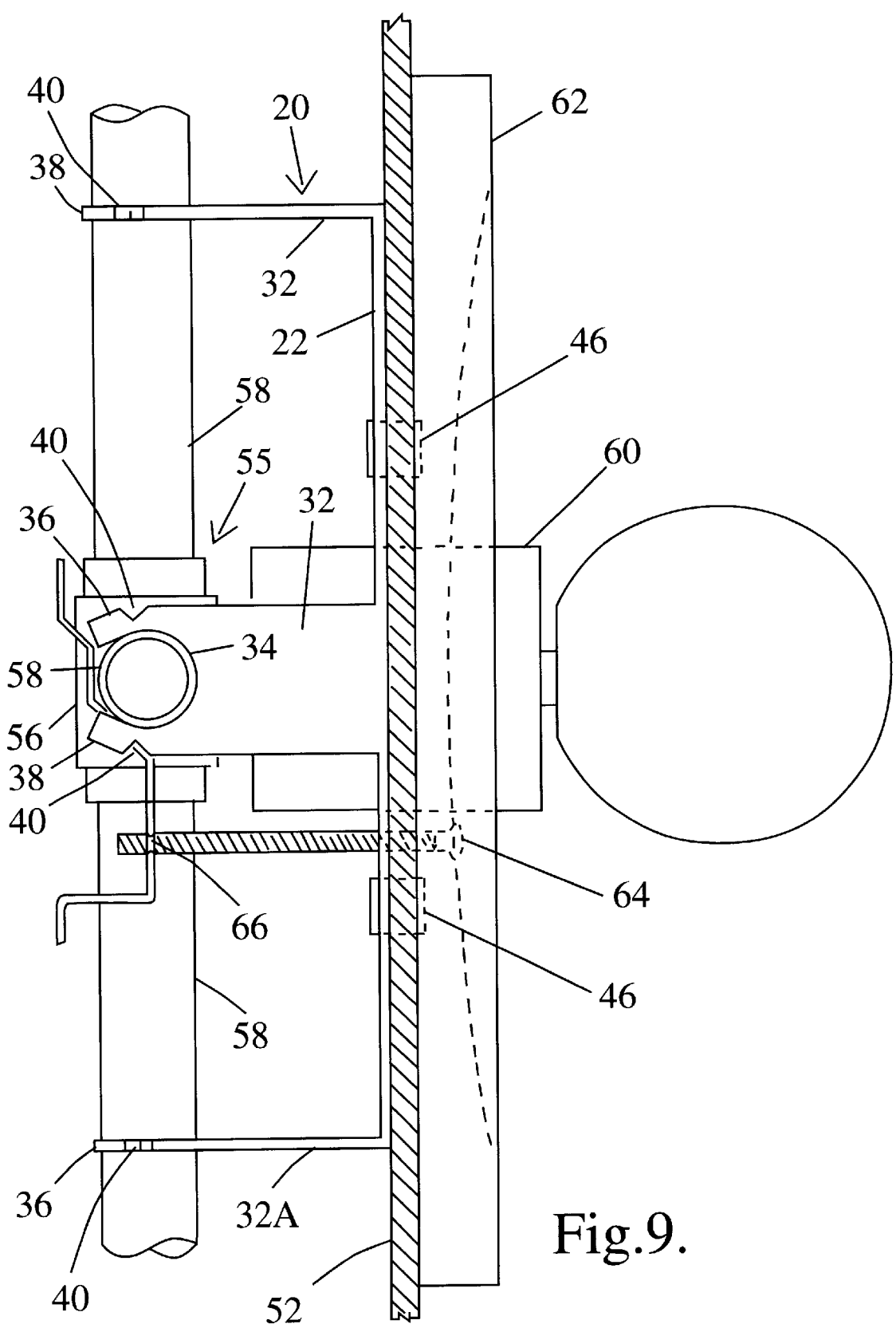
FIG. 9 shows a side view of the mounting bracket retaining a prepared mixing valve, and being attached to a shower wall.
Figure 10:
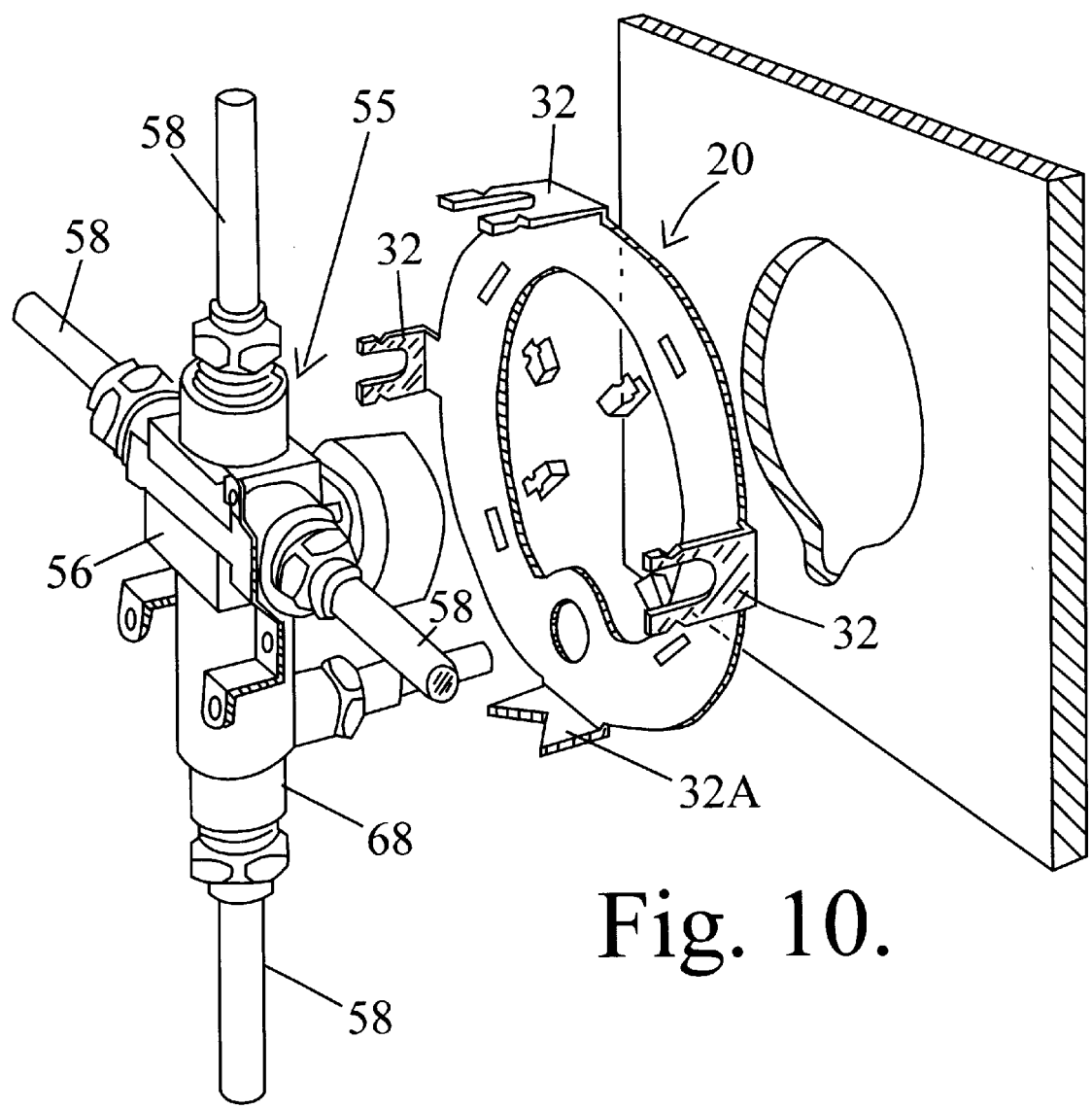
FIG. 10 shows a perspective/exploded view of the mounting bracket, spring clips, prepared mixing valve, and a section of a fiber glass shower wall.
Figure 11:
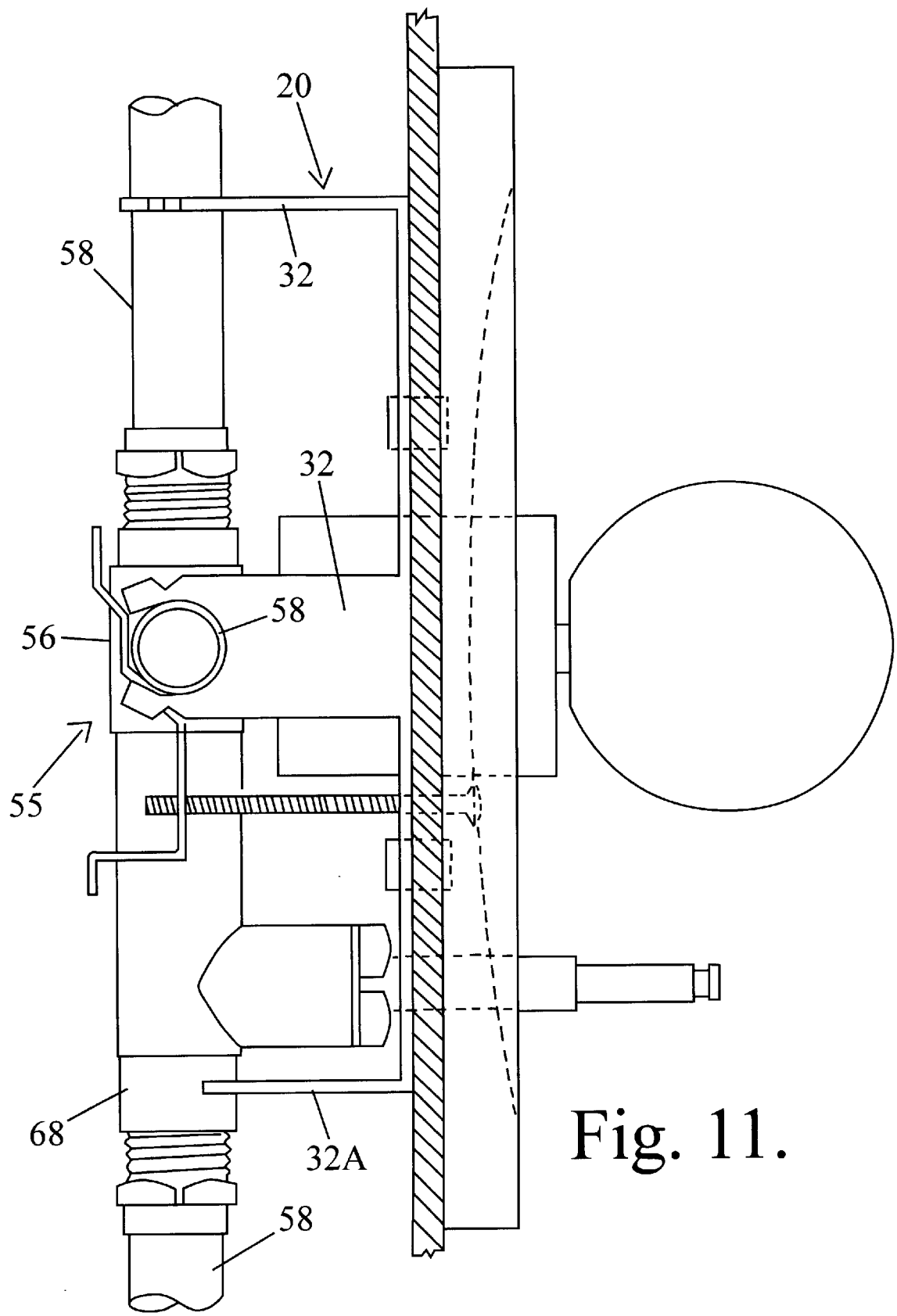
FIG. 11 shows a side view of the mounting bracket retaining a prepared mixing valve, and being attached to a shower wall.

Referring now to FIGS. 6, and 9, a universal mounting bracket 20 comprised of a plurality of forked projections 32 and 32A, axial positioned at 90 degrees to one another, upon the outer rim of the bracket body 22. The forked projections 32 and 32A being configured with a centrally located U shaped void 34, creating a left prong 36, and a right prong 38 upon each forked projection. Each left and right prong 36 and 38, having a notch 40 located upon their leading edges. A prepared shower mixing valve 55, comprised of a mixing valve 56, and a plurality of pre-attached copper tubes 58 are saddled into the U shaped voids 34 of the forked projections 32 and 32A. The left prong 36, and the right prong 38 are then bent around the copper tubes 58, by pinching the prongs toward one another with a pair of pliers. The notches 40 having reduced the tensile strength of the prongs 36 and 38 aid the bending process. With the universal mounting bracket 20 clipped to the rear of the fiber glass shower wall 52, and the prepared mixing valve 55 affixed to the plurality of forked projections 32 and 32A, a mixing valve control stem 60 now extends forward through the mounting aperture 24, and the wall aperture 54, and into the interior of a shower enclosure, not shown.

Referring now to FIG. 9, a universal mounting bracket 20 is abutted to the reverse side of a fiber glass shower wall 52, and clipped into position upon the shower wall with a plurality of spring clips 46. A prepared shower mixing valve 55 is saddled into a plurality of forked projections 32 and 32A, which extend rearward from the mounting bracket 20. The forked projections 32 and 32A comprised of a left prong 36, and a right prong 38, are pinched around a plurality of copper tubes 58, which are attached to the prepared mixing valve 55, affixing the prepared mixing valve to the mounting bracket. The prepared mixing valve is shown with a control stem 60 protruding through a escutcheon 62 on the interior side of the fiber glass shower wall 52. The escutcheon 62 is abutted to the shower wall 52 with a plurality of attachment screws 64, (only one screw shown) protruding through the escutcheon and into tapped receptacles 66, (only one receptacle shown) located on the prepared mixing valve. The attachment screws 64 are shown to be tight within their receptacles 66, with the mounting bracket 20, and the fiber glass wall 52, tightly sandwiched between the escutcheon and the prepared mixing valve, completing a secure installation.

Referring now to FIGS. 10, 11, 12, and 13, a universal mounting bracket 20, comprising a plurality of forked projections 32 and 32A. The forked projection 32A, as shown enlarged in FIG. 12, having a V shaped cleavage indentation 42 stamped into its embodiment The cleavage indentation 42 projecting outward from a central slot 44 to each leading edge of the forked projection. The cleavage indentation reducing the tensile strength of the sheet metal, allowing a portion of the metal to be bent and broken away from the embodiment of the forked projection 32A, creating a altered forked projection, as shown enlarged in FIG. 13. The altered fork projection 32A configured to cradle a lower embodiment 68 of a prepared shower mixing valve 55. The lower embodiment 68 of the mixing valve 56 having a larger diameter than a plurality of copper tubes 58. The plurality of copper tubes 58 being attached to the mixing valve 56, saddle into a plurality of forked projections 32, and the lower embodiment 68 of the mixing valve 56 saddles into the altered forked projection 32A, which will now accept the larger diameter embodiment.

Conclusion, Ramifications, and Scope

It can be realized from the described operations that plumbers builders, and the occasional remodeler will quickly see the advantages of using the universal mounting bracket, by understanding its convenience, safety related concerns, and associated liability when performing such mixing valve installations. Such individuals will also realize that since the mounting bracket will not impair the freedom of movement needed by an installer to perform all work related functions in performing an installation, the bracket is truly novel, and produces surprising results.

I claim:

1. A universal mounting bracket for adjoining a plurality of tubing members radially connected and extending from a central mixing valve to a substantially thin vertical wall comprising;

a singular unit bracket configured with a vertical abutting face having a overlapping pair of substantially disproportionate apertures respectfully aligned upon a vertical axis, and a plurality of spring clip retaining apertures coaxial positioned around a larger of said disproportionate apertures through said face of said bracket;

a plurality of forked projections horizontally fixed upon an outer rim of said face of said bracket respectfully positioned to align with said plurality of said tubing members of said prepared mixing valve configured with a U shaped void upon their tips creating a left fork prong and a right fork prong upon each said projection, whereby said voids provide a cradling position for said tubing members of said prepared mixing valve;

clipping means for adjoining said bracket onto said wall when the larger of said disproportionate apertures through said face is butted into alignment with a substantially circular mating aperture prepared through said wall.

2. The mounting bracket of claim 1 wherein said larger aperture is crescent shaped and positioned substantially in the center of said face, and a smaller aperture is circular shaped and positioned below within the radius of said larger aperture, and said overlapping apertures are separated by an arched web formed upon said face of said bracket.

3. The mounting bracket of claim 1 wherein said left prong and said right prong are further characterized by a configured notch upon their leading edges, whereby said notches reduce the tensile strength of said prongs allowing said prongs to be pinched toward one another to secure said tubing members of said prepared mixing valve when respectfully cradled into said voids of said forked projections.

4. The mounting bracket of claim 1 wherein the lower forked projection is further characterized as having a pair of cleavage indentations stamped into its embodiment projecting outward from a central slot in an angular direction to each leading edge of said lower forked projection, forming a V configuration upon the lower forked projection, whereby said cleavage indentations reduce the tensile strength allowing a portion of said forked projection to be bent and broken away; thereby forming an altered forked projection capable of receiving a larger diameter member of said prepared mixing valve.

5. The mounting bracket of claim 1 wherein said clipping means further comprises a plurality of U shaped spring clips configured with a projection upon one leg of each said spring clip, whereby said projection of said spring clips will lock into said retaining apertures respectfully when, attaching said mounting bracket to said wall.

* * * * *